United States Patent
Miller et al.

(10) Patent No.: US 8,722,274 B2
(45) Date of Patent: May 13, 2014

(54) DATUM INSERT FOR SHORTING PROTECTION ON A FUEL CELL PLATE

(75) Inventors: Daniel P. Miller, Victor, NY (US);
Mark W. Keyser, Bloomfield, NY (US);
Steven J. Spencer, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 354 days.

(21) Appl. No.: 12/859,343

(22) Filed: Aug. 19, 2010

(65) Prior Publication Data
US 2012/0045709 A1  Feb. 23, 2012

(51) Int. Cl.
*H01M 2/20* (2006.01)
*H01M 8/24* (2006.01)
*H01M 8/04* (2006.01)

(52) U.S. Cl.
USPC .......................... 429/467; 429/469; 429/470

(58) Field of Classification Search
USPC ............. 429/38, 32, 30, 31, 35, 36, 452–461, 429/463, 464–471, 507–511, 516, 535
See application file for complete search history.

(56) References Cited

U.S. PATENT DOCUMENTS

| 4,124,478 | A  | * | 11/1978 | Tsien et al. ................... 204/255 |
| 6,071,635 | A  | * | 6/2000  | Carlstrom, Jr. ............... 429/413 |
| 6,344,290 | B1 | * | 2/2002  | Bossel .......................... 429/456 |
| 6,773,843 | B2 | * | 8/2004  | Kitagawa et al. ............. 429/457 |
| 2002/0127453 | A1 | | 9/2002 | Kitagawa et al. |
| 2003/0044668 | A1 | * | 3/2003 | Sugita et al. ..................... 429/32 |
| 2004/0096725 | A1 | * | 5/2004 | Mao et al. ........................ 429/38 |
| 2007/0015034 | A1 | * | 1/2007 | Vyas et al. ....................... 429/34 |
| 2008/0014498 | A1 | * | 1/2008 | Ogawa et al. .................. 429/149 |

FOREIGN PATENT DOCUMENTS

CN  101312249 A  11/2008

* cited by examiner

*Primary Examiner* — John S. Maples
*Assistant Examiner* — Jimmy K Vo
(74) *Attorney, Agent, or Firm* — Fraser Clemens Martin & Miller LLC; J. Douglas Miller

(57) ABSTRACT

A subassembly for a fuel cell stack includes a fuel cell plate and a datum hole formed in the fuel cell plate for alignment of the fuel cell plate during assembly of the fuel cell stack. The subassembly also includes a datum insert disposed adjacent the datum hole of the fuel cell plate. The datum insert is configured to militate against a bending of the fuel cell plate at the datum hole during the assembly of the fuel cell stack.

20 Claims, 7 Drawing Sheets

DATUM INSERT FOR SHORTING PROTECTION ON A FUEL CELL PLATE

FIELD OF THE INVENTION

The present disclosure relates to a fuel cell and, more particularly, to a conductive plate assembly for the fuel cell.

BACKGROUND OF THE INVENTION

A fuel cell has been proposed as a clean, efficient and environmentally responsible power source for electric vehicles and various other applications. Individual fuel cells can be stacked together in a series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media (DM), such as carbon fiber paper, which facilitates a delivery of reactants, such as hydrogen to the anode and oxygen to the cathode. An MEA and DM preassembled together with a subgasket for the separation of reactant fluids is known as a unitized electrode assembly (UEA).

In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load, such as an electric motor. The protons react with the oxygen and the electrons in the cathode to generate water.

The electrolyte membrane is typically formed from a layer of ionomer. The electrodes of the fuel cell are generally formed from a finely divided catalyst. The catalyst may be any electro-catalyst that catalytically supports at least one of an oxidation of hydrogen or methanol and a reduction of oxygen for the fuel cell electrochemical reaction. The catalyst is typically a precious metal such as platinum or another platinum-group metal. The catalyst is generally disposed on a carbon support, such as carbon black particles, and is dispersed in an ionomer.

The electrolyte membrane, electrodes, DM, and subgasket, for example, in the form of the UEA, are disposed between a pair of fuel cell plates. The pair of fuel cell plates constitutes an anode plate and a cathode plate. Each of the fuel cell plates may have a plurality of channels formed therein for distribution of the reactants and coolant to the fuel cell. The fuel cell plate is typically formed by a conventional process for shaping sheet metal such as stamping, machining, molding, or photo etching through a photolithographic mask, for example. In the case of a bipolar fuel cell plate, the fuel cell plate is typically formed from a pair of unipolar plates, which are then joined to form the bipolar fuel cell plate.

It is known to provide the fuel cell plates and the subgasket of the UEA with datum holes. During assembly of the fuel cell stack, the fuel cell plates are positioned over datum pins. The datum pins are typically formed from metal and disposed through the datum holes to properly align the fuel cell plates. The datum pins can undesirably deform, for example, bend or flare the metal around the plate datum holes during the assembly. The deformed metal around the datum holes of the fuel cell plates can contact an adjacent fuel cell plate when the fuel cell stack is assembled, and thereby cause electrical shorting of the fuel cell stack.

There is a continuing need for a subassembly for a fuel cell stack that minimizes an opportunity for datum holes of a fuel cell plate to become deformed upon contact with datum pins during assembly of the fuel cell stack.

SUMMARY OF THE INVENTION

In concordance with the instant disclosure, a subassembly for a fuel cell stack that minimizes an opportunity for datum holes of a fuel cell plate to become deformed upon contact with datum pins during assembly of the fuel cell stack, is surprisingly discovered.

In one embodiment, a subassembly for a fuel cell stack includes a fuel cell plate having a datum hole formed in the fuel cell plate for alignment of the fuel cell plate during assembly of the fuel cell stack. A datum insert is disposed adjacent the datum hole of the fuel cell plate. The datum insert is configured to militate against a bending of the fuel cell plate at the datum hole during the assembly of the fuel cell stack.

In another embodiment, the datum insert includes an opening configured to receive a datum pin during the assembly of the fuel cell stack. The fuel cell plate also includes a first unipolar plate bonded to a second unipolar plate. The datum insert disposed between the first and second unipolar plates at the datum hole. The bonding of the first unipolar plate and the second unipolar plate includes at least one stitch weld disposed adjacent to the datum hole. At least one retainer is also disposed through the fuel cell plate and the datum insert. The retainer is a stake configured to securely hold the datum insert in place.

In a further embodiment, a subgasket is disposed adjacent to the fuel cell plate. The subgasket has a hole that is aligned with the datum hole of the fuel cell plate. The datum insert further includes a stepped portion that abuts an edge of one of the first unipolar plate and the second unipolar plate.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
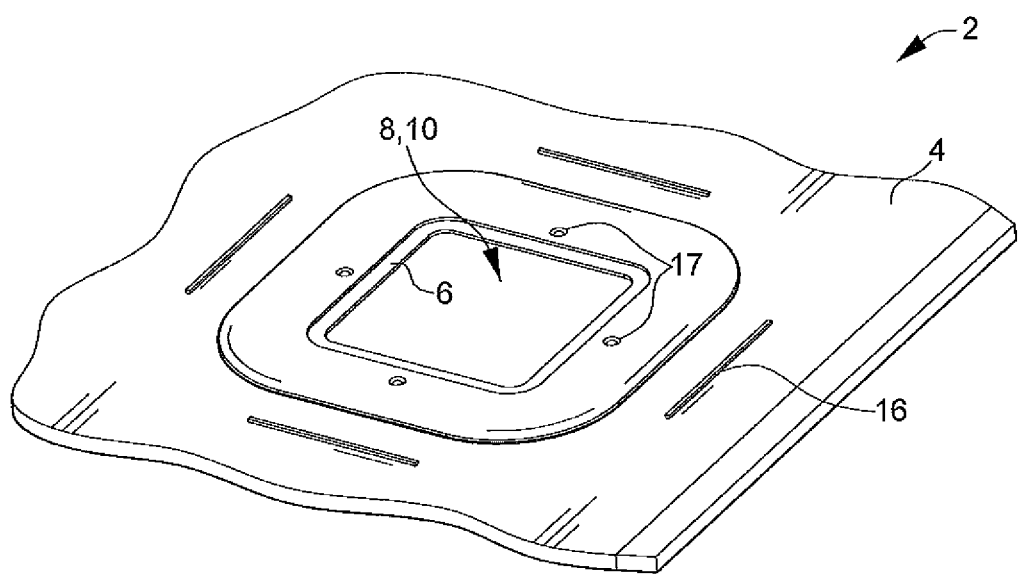
FIG. 1 is a fragmentary top perspective view of a fuel cell subassembly according to one embodiment of the present disclosure.
Figure 2:
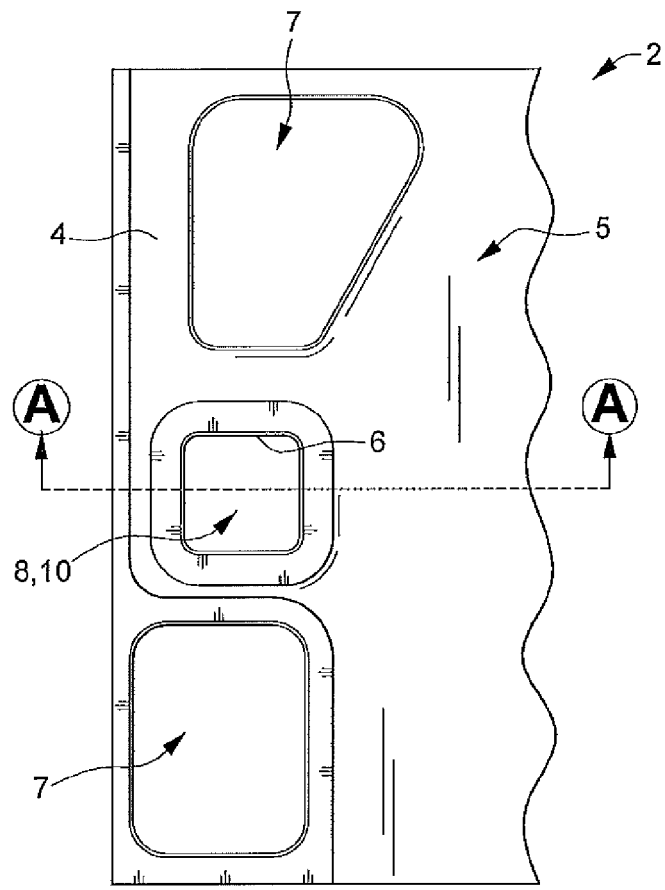
FIG. 2 is a fragmentary top plan view of the fuel cell subassembly shown in FIG. 1.
Figure 3:
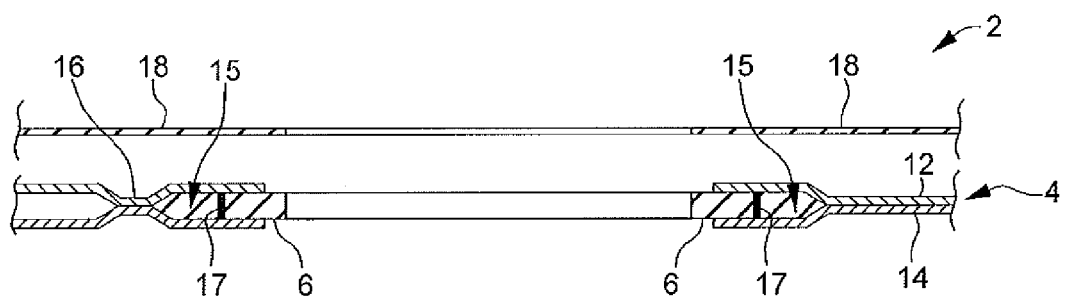
FIG. 3 is a fragmentary side cross-sectional elevational view of the fuel cell subassembly taken along section line A-A in FIG. 2, and shown with a subgasket disposed adjacent thereto.

With reference to FIGS. 1-3, a subassembly 2 for a fuel cell stack (not shown) includes a fuel cell plate 4 and a datum insert 6. The fuel cell plate 4 may include a flow field 5 disposed between a pair of headers with reactant inlet and outlet apertures 7 formed therein, for example, as shown in U.S. application Ser. No. 12/022,694 to Keyser et al., the entire disclosure of which is hereby incorporated herein by reference. A datum hole 8 is further formed in the fuel cell plate 4 according to the present disclosure. The datum hole 8 is provided for alignment of the fuel cell plate 4 during assembly of the fuel cell stack, for example, through the employment of a datum rod (not shown) disposed through a plurality of the fuel cell plates 4 forming the fuel cell stack.

The datum insert 6 is disposed adjacent the datum hole 8 of the fuel cell plate 4. The datum insert 6 militates against a bending of the fuel cell plate 4 at the datum hole 8 during the assembly of the fuel cell stack, for example, when the datum rod is disposed through the datum hole 8 of the fuel cell plate 4.

The datum insert 6 may include an opening 10. The opening 10 is configured to receive the datum pin during the assembly of the fuel cell stack. The opening 10 may have a shape that substantially corresponds to a cross-sectional shape of the datum pin. As a nonlimiting example, the shape of the opening 10 may be substantially square in order to minimize an opportunity for rotation of the fuel cell plate 4 about the datum pin during the fuel cell stack assembly.

In the embodiment shown in FIGS. 1-3, the fuel cell plate 4 includes a first unipolar plate 12 and a second unipolar plate 14. The first unipolar plate 12 is bonded to the second unipolar plate 14. As a nonlimiting example, the bonding of the first unipolar plate 12 and the second unipolar plate 14 may include at least one stitch weld 16 disposed adjacent to the datum hole 8. Other suitable means for bonding the first and second unipolar plates 12, 14 together such as brazing and adhesives may also be employed, as desired.

The datum insert 6 is disposed between the first and second unipolar plates 12, 14 at the datum hole 8. For example, edges of the first and second unipolar plates 12, 14 defining the datum hole 8 may sandwich and securely hold the datum insert 6 in place in the fuel cell plate 4. In particular, the datum insert 6 may be disposed in a pocket 15 defined by the first and second unipolar plates 12, 14. The subassembly 2 may also include at least one retainer 17 for securely holding the datum insert 6 in place. The retainer 17 may be disposed through the fuel cell plate 4, for example. In certain embodiments, the retainer 17 includes one of a weld, an adhesive, a stake, and a rivet. A skilled artisan may select other suitable means for the retainer 17, within the scope of the present disclosure.

It should be understood that, after insertion of the datum insert 6 in the datum hole 8 of the fuel cell plate 4, a subgasket 18, for example, from a unitized electrode assembly, may be disposed atop the fuel cell plate 4. The subgasket 18 may also be provided as a component separate from a membrane electrode assembly of the fuel cell stack, as desired.

In one embodiment, the fuel cell plate 4 is formed from a metal such as a stainless steel or the like. The datum insert 6 is formed from a nonconductive material. The nonconductive material for the datum insert 6 has a mechanical strength sufficient to not substantially deform upon contact with the datum pin during assembly of the fuel cell stack. For example, the datum insert 6 may be one of a ceramic material and a plastic material. Illustratively, the datum insert 6 may be formed from a fluoropolymer such as polytetrafluoroethylene or a fluoropolymer-coated plastic or metal.

It should be appreciated that the datum insert 6 is the active datum feature of the fuel cell plate 4 during assembly of the fuel cell stack. An elastomeric material such as a cross-linked rubber is therefore not suitable for the datum insert 6, as elastomeric materials cause an undesirable binding of the datum insert 6 with the datum pin when the datum pin is inserted through the datum hole 8. The datum pins instead slide smoothly along the edges of the datum insert 6 formed from nonconductive and nonbinding materials such as ceramic and plastic, and do not bind or bend the datum insert 6 during the assembly of the fuel cell stack. Other suitable, nonconductive and nonbinding materials may also be used for the datum insert 6, as desired.

Further embodiments of the subassembly 2 according to the present disclosure are illustrated in FIGS. 4-13.

Figure 4:
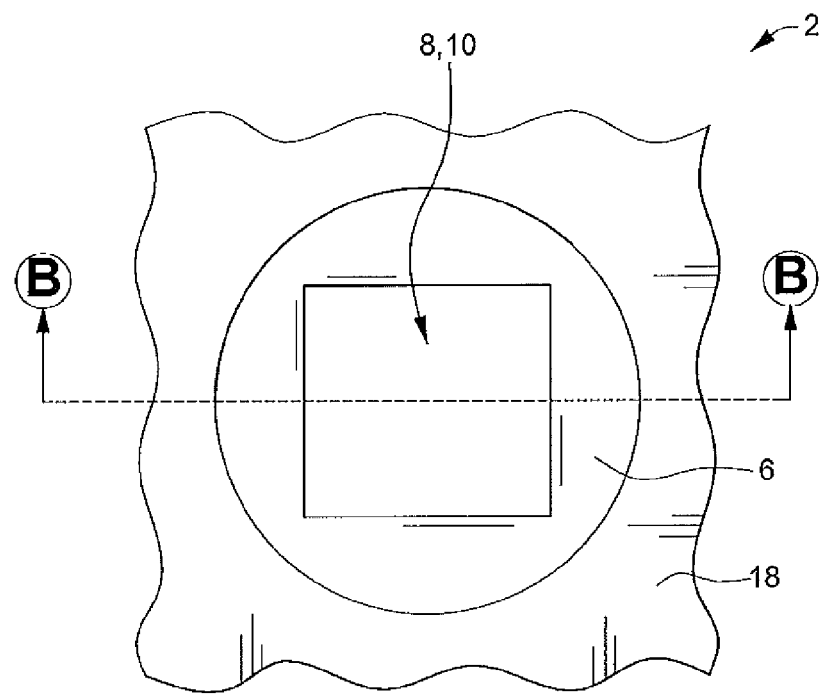
FIG. 4 is a fragmentary top plan view of a fuel cell subassembly according to another embodiment of the present disclosure.
Figure 5:
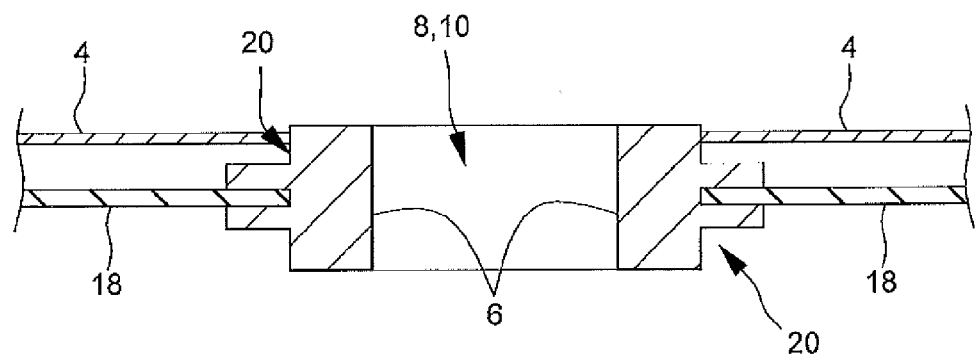
FIG. 5 is a fragmentary side cross-sectional elevational view of the fuel cell subassembly taken along section line B-B in FIG. 4, and shown with a fuel cell plate disposed adjacent thereto.

With reference to FIGS. 4-5, the datum insert 6 may be coupled to the subgasket 18. The coupling of the datum insert 6 with the subgasket 18 may be performed as desired. As a nonlimiting example, the datum insert 6 may be overmolded on the subgasket 18. The datum insert 6 may further have a stepped portion 20. The stepped portion 20 may cooperate with the datum hole 8 formed in the fuel cell plate 4. In certain embodiments, the stepped portion 20 may be disposed through the datum hole 8 of the fuel cell plate 4, and thereby militate against a deformation of the edges of the fuel cell plate 4 defining the datum hole 8 when the datum pin is inserted.

Figure 6:
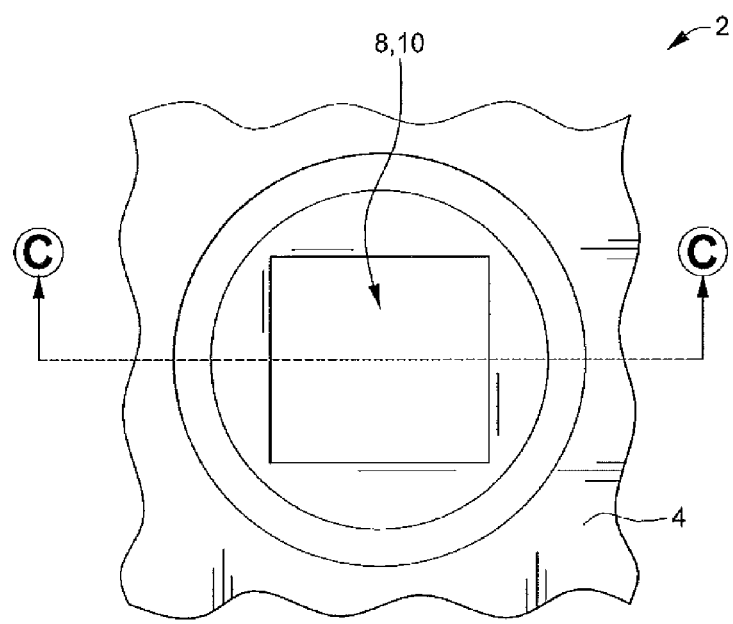
FIG. 6 is a fragmentary top plan view of a fuel cell subassembly according to a further embodiment of the present disclosure.
Figure 7:
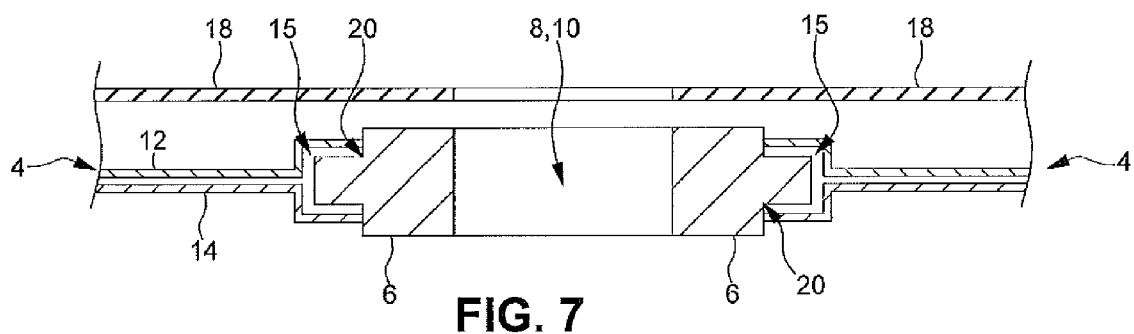
FIG. 7 is a fragmentary side cross-sectional elevational view of the fuel cell subassembly taken along section line C-C in FIG. 6, and shown with a subgasket disposed adjacent thereto.

As shown in FIGS. 6 and 7, where the datum insert 6 is disposed between the first and second unipolar plates 12, 14 of the fuel cell plate 4, the datum insert 6 may also include the stepped portion 20. The stepped portion 20 may abut the edge of one of the first unipolar plate 12 and the second unipolar plate 14 that defines the datum hole 8. In a particular embodiment, the datum insert 6 has a pair of the stepped portions 20. Each of the stepped portions 20 abuts one of the edge of the first unipolar plate 12 and the edge of the second unipolar plate 14. The subgasket 18 is disposed atop the fuel cell plate 4 to complete the subassembly 2 for the fuel cell stack.

Figure 8:
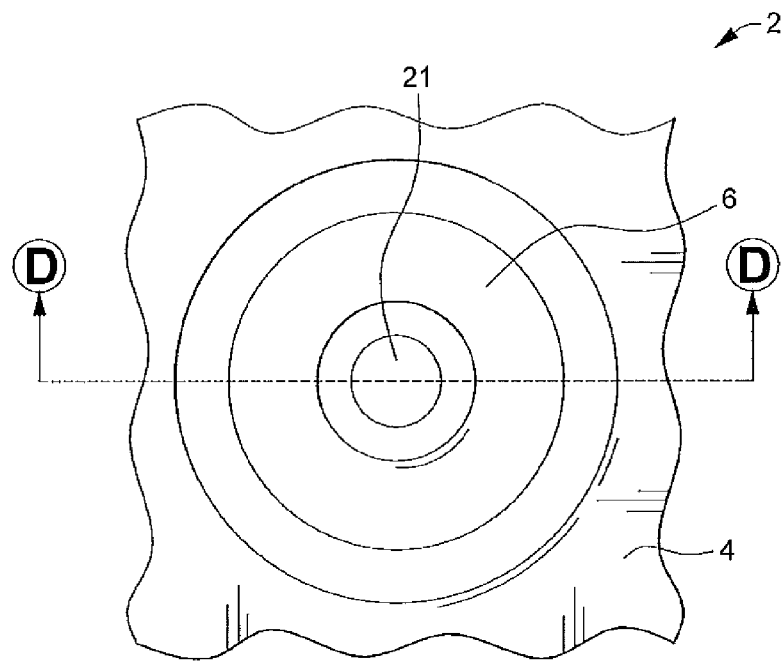
FIG. 8 is a fragmentary top plan view of a fuel cell subassembly according to an additional embodiment of the present disclosure.
Figure 9:
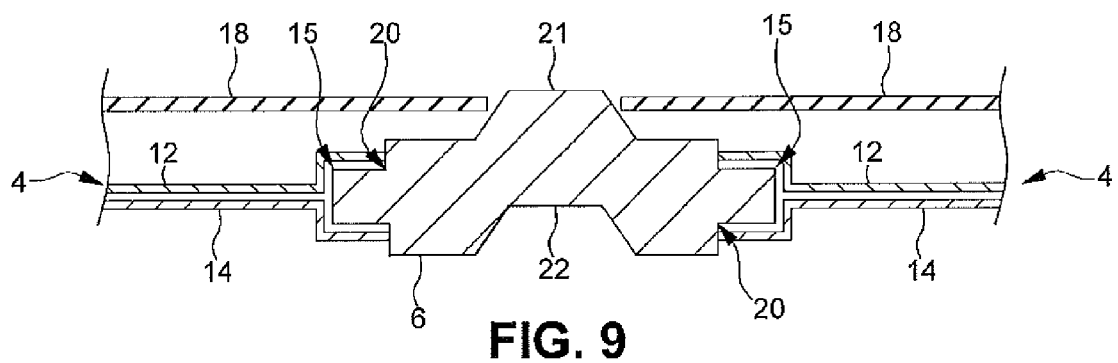
FIG. 9 is a fragmentary side cross-sectional elevational view of the fuel cell subassembly taken along section line D-D in FIG. 8, and shown with a subgasket disposed adjacent thereto.

Referring now to FIGS. 8 and 9, the present disclosure further includes an embodiment of the subassembly 2 where the datum pin is not required to align the subassembly 2 during the assembly of the fuel cell stack. In particular, where the fuel cell plate 4 includes the first unipolar plate 12 bonded to the second unipolar plate 14, and the datum insert 6 is disposed between the first and second unipolar plates 12, 14 at the datum hole 8, the datum insert 6 may have a first side with a protrusion 21 and an opposing second side with a recess 22.

The protrusion 21 of the datum insert 6 is configured to be received by the recess 22 of another datum insert 6 disposed adjacent thereto in the assembled fuel cell stack. The protrusion 21 may be disposed through the subgasket 18 disposed adjacent to the fuel cell plate 4 and cooperate with the recess of the other datum insert 6 of the adjacent fuel cell plate 4, for example. It should be appreciated that the cooperation of the protrusions 21 and the recesses 22 of a plurality of the fuel cell plates 4 in the fuel cell stack eliminates the need for the datum pin to align the fuel cell plates 4 during assembly of the fuel cell stack.

Figure 10:
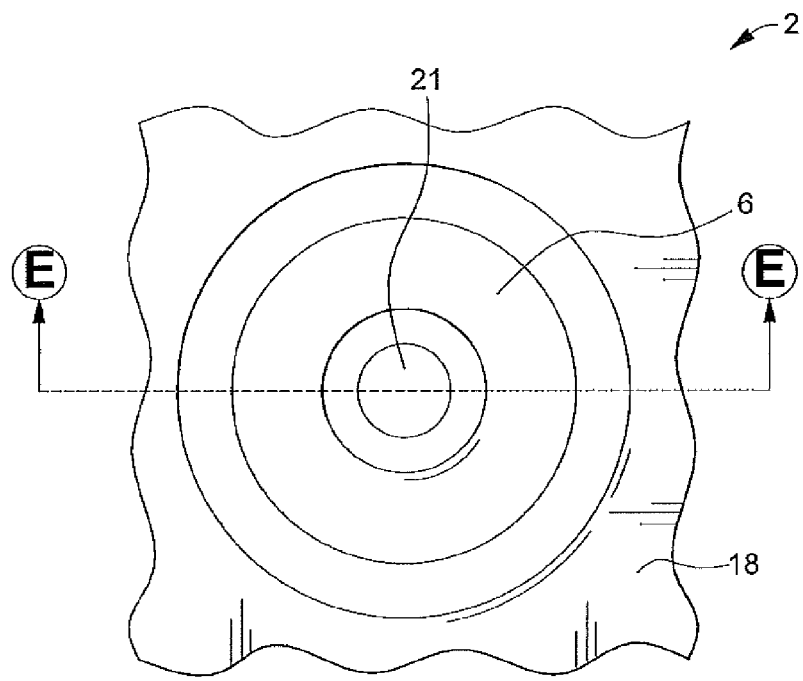
FIG. 10 is a fragmentary top plan view of a fuel cell subassembly according to an illustrative embodiment of the present disclosure.
Figure 11:
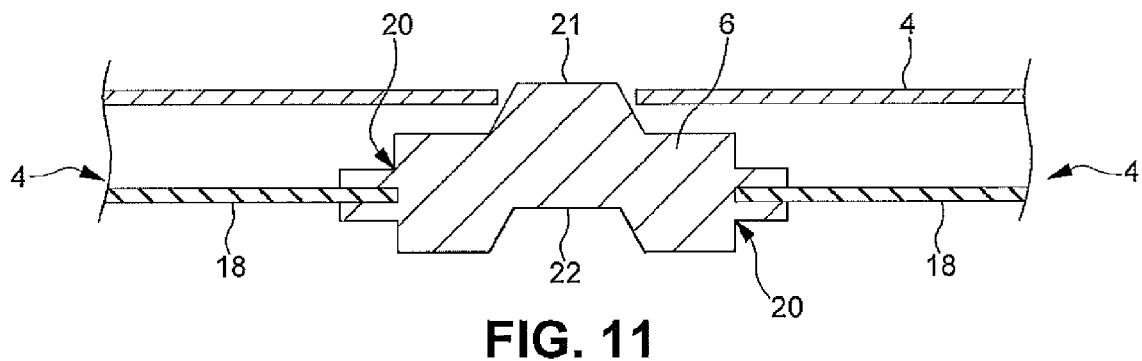
FIG. 11 is a fragmentary side cross-sectional elevational view of the fuel cell subassembly taken along section line E-E in FIG. 10, and shown with a fuel cell plate disposed adjacent thereto.

In a further embodiment shown in FIGS. 10 and 11, the datum insert 6 having the protrusion 21 and the recess 22 may be coupled with the subgasket 18, and the protrusion 21 disposed through the datum hole 8 in the adjacent fuel cell plate 4. As with earlier embodiments, the datum insert 6 may be overmolded on the subgasket 18, or otherwise coupled to the subgasket 18 as desired.

As with other embodiments, the datum insert 6 having the opposing protrusion 21 and recess 22 may include the stepped portion 20. The stepped portion 20 abuts the edge of one of the first unipolar plate 12 and the second unipolar plate 14 defining the datum hole 8.

Figure 12:
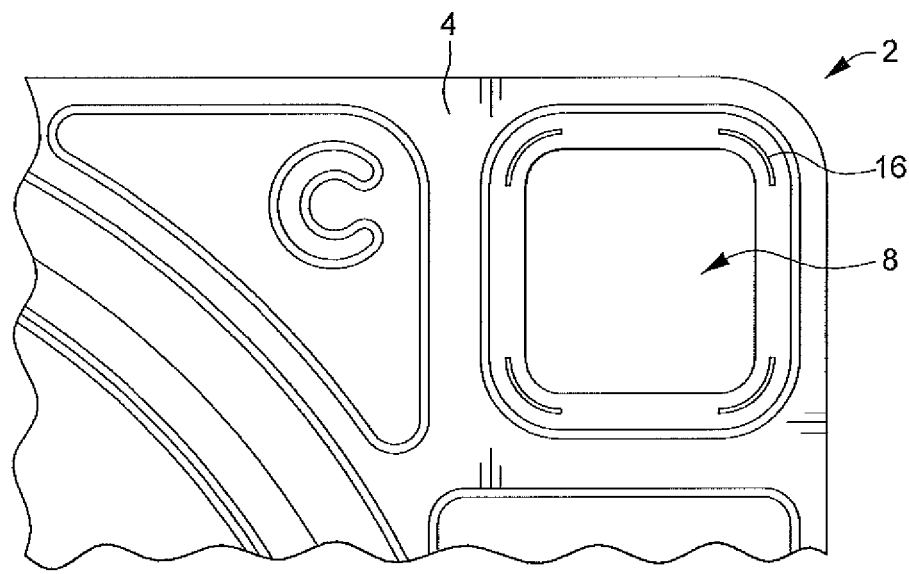
FIG. 12 is a fragmentary top plan view of a fuel cell subassembly according to an alternative embodiment of the present disclosure, shown without a datum insert.
Figure 13:
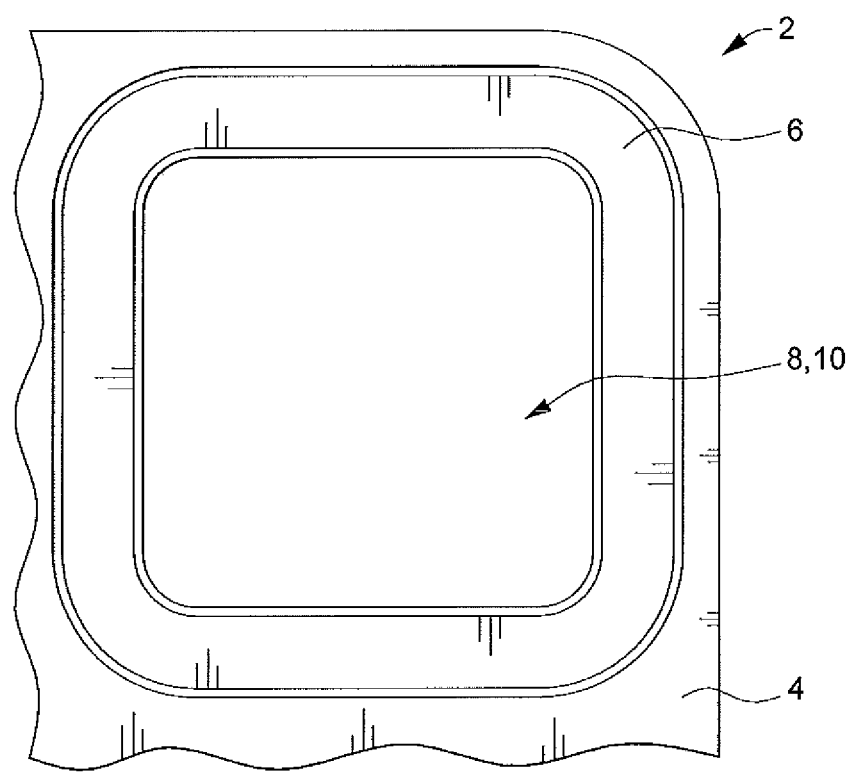
FIG. 13 is a fragmentary top plan view of the fuel cell subassembly shown in FIG. 12, shown with the datum insert disposed thereon.

Referring to FIGS. 12 and 13, the subassembly 2 of the present disclosure may further have the datum insert 6 disposed on a major surface of the fuel cell plate 4. The datum insert 6 may circumscribe the datum hole 8, for example. The datum insert 6 may be bonded to the major surface, for example, with an adhesive or the like. Where the fuel cell plate 4 includes the first unipolar plate 12 bonded to the second unipolar plate 14, at least one stitch weld 16 may be disposed adjacent to the datum hole 8 and underneath the datum insert 6.

With renewed reference to FIGS. 1-3, a method for manufacturing the subassembly 2 first includes locating the datum insert in-between the first and second unipolar plates 12, 14. Then the first and second unipolar plates 12, 14 are then welded together. Desirably, the welding is first performed in order to take into account any weld shrinkage that may occur before the staking of the datum insert 6 locks the datum insert 6 in place.

The datum insert 6 is then accurately placed at the datum hole 8. The datum insert 6 may be placed between the first and second unipolar plates 12, 14, which function as anode and cathode plate halves for the fuel cell plate 4. As a nonlimiting example, the datum insert 6 sits in the pocket 15 defined by the first and second unipolar plates 12, 14, which pocket 15 accommodates a thickness of the datum insert 6.

The pocket 15 then receives a plurality of retainers 17 such as stakes or dimples. The pocket 15 may receive, for example, one stake for each side of a square-shaped datum hole 8. The stakes drive a portion of the fuel cell plate 4 into the datum insert 6, thereby locking the datum insert 6 in place. The datum insert 6 has the opening 10, which then functions as the datum hole 8 for use with the datum pin to align the fuel cell plate 4.

The datum insert 6 having the opening 10 may then be used in subsequent operations such as seal application to the fuel cell plate 4, a heat sealing of the unitized electrode assembly or UEA to the fuel cell plate 4, and in the final assembly of the fuel cell stack, for example. Various tooling may be employed in the subsequent operations without risk of deforming the fuel cell plate 4.

It should be appreciated that, in contrast to known plates where bare metal edges of the plates defines holes for use with datum pins, the datum insert 6 of the present disclosure minimizes an opportunity for deformation of the fuel cell plate 4 by fixture and tooling pins, final assembly datum pins, and the like. Advantageously, the datum insert 6 militates against a puncturing or pushing aside of the subgasket 18 during assembly of the fuel cell stack, which would otherwise result in plate-to-plate electrical shorting. The datum insert 6 also provides electrical insulation in the region of the datum hole 8, to further militate against the plate-to-plate shorting of the assembled fuel cell stack.

While certain representative embodiments and details have been shown for purposes of illustrating the invention, it will be apparent to those skilled in the art that various changes may be made without departing from the scope of the disclosure, which is further described in the following appended claims.

What is claimed is:

1. A subassembly for a fuel cell stack, comprising:
   a conductive fuel cell plate including a datum hole formed in the fuel cell plate for alignment of the fuel cell plate during an assembly of the fuel cell stack, wherein the fuel cell plate includes a first unipolar plate bonded to a second unipolar plate, the datum hole defined by edges of the first unipolar plate and the second unipolar plate; and
   a non-conductive datum insert disposed within the datum hole of the fuel cell plate and configured to militate against a bending of the fuel cell plate around the datum hole during the assembly of the fuel cell stack, wherein the datum insert includes an opening configured to receive a datum pin for alignment of the fuel cell plate during an assembly of the fuel cell stack,
   wherein a first portion of the datum insert is disposed between the first unipolar plate and the second unipolar plate at the datum hole, a second portion of the datum insert extends inwardly toward the datum hole and away from the edges of the first unipolar plate and the second unipolar plate, and the opening is defined by at least one edge of the second portion of the datum insert that is spaced apart from the edges of the first unipolar plate and the second unipolar plate.

2. The subassembly of claim 1, wherein the bonding of the first unipolar plate and the second unipolar plate includes at least one stitch weld disposed adjacent the datum hole.

3. The subassembly of claim 1, further comprising at least one retainer disposed through the fuel cell plate and the datum insert configured to secure the datum insert in place.

4. The subassembly of claim 3, wherein the retainer includes one of a weld, an adhesive, a stake, and a rivet.

5. The subassembly of claim 1, wherein the datum insert is coupled to a subgasket.

6. The subassembly of claim 5, wherein the datum insert is overmolded on the subgasket.

7. The subassembly of claim 1, wherein the datum insert includes a stepped portion abutting at least one of the edges of one of the first unipolar plate and the second unipolar plate.

8. The subassembly of claim 1, wherein the datum insert is disposed between the first and second unipolar plates at the datum hole, the datum insert having a first side with a protrusion and a second side with a recess.

9. The subassembly of claim 8, wherein the protrusion of the datum insert is configured to be received by the recess of an adjacent datum insert.

10. The subassembly of claim 9, wherein the second portion of the datum insert includes a stepped portion abutting at least one of the edges of one of the first unipolar plate and the second unipolar plate.

11. The subassembly of claim 10, wherein the protrusion of the datum insert is disposed through a subgasket disposed adjacent the fuel cell plate.

12. The subassembly of claim 1, wherein the bonding of the first unipolar plate and the second unipolar plate includes at least one stitch weld disposed adjacent the datum hole, the stitch weld disposed underneath the datum insert.

13. The subassembly of claim 1, wherein the fuel cell plate is formed from a metal.

14. The subassembly of claim 1, wherein the datum insert is formed from a non-conductive material having a mechanical strength sufficient to not deform upon contact with the datum pin during assembly of the fuel cell stack.

15. The subassembly of claim 1, wherein the datum insert is formed from one of a ceramic material and a plastic material.

16. The subassembly of claim 1, wherein the datum insert is disposed in a pocket defined by the first unipolar plate and the second unipolar plate.

17. The subassembly of claim 1, wherein the opening of the datum insert has a shape substantially corresponding to a cross-sectional shape of the datum pin.

18. The subassembly of claim 1, wherein the datum insert is configured to facilitate sliding of the datum pin along the at least one edge of the opening of the datum insert and to militate against a bending of the datum insert.

19. A subassembly for a fuel cell stack, comprising:
a conductive fuel cell plate including a flow field disposed between a pair of headers, the headers including an aperture formed in the fuel cell plate for supplying a reactant to the flow field, and a datum hole formed in the fuel cell plate for alignment of the fuel cell plate during an assembly of the fuel cell stack; and
a non-conductive datum insert disposed within the datum hole of the fuel cell plate and configured to militate against a bending of the fuel cell plate around the datum hole during the assembly of the fuel cell stack,
wherein the datum insert includes an opening configured to receive a datum pin during the assembly of the fuel cell stack,
wherein the fuel cell plate includes a first unipolar plate bonded to a second unipolar plate, the datum insert disposed between the first and second unipolar plates at the datum hole, the datum hole defined by edges of the first unipolar plate and the second unipolar plate,
wherein the bonding of the first unipolar plate and the second unipolar plate includes at least one stitch weld disposed adjacent to the datum hole, and at least one retainer disposed through the fuel cell plate and the datum insert configured to secure the datum insert in place, wherein the retainer includes a stake, and
wherein a first portion of the datum insert is disposed between the first unipolar plate and the second unipolar plate at the datum hole, a second portion of the datum insert extends inwardly toward the datum hole and away from the edges of the first unipolar plate and the second unipolar plate, and the opening is defined by at least one edge of the second portion of the datum insert that is spaced apart from the edges of the first unipolar plate and the second unipolar plate.

20. A subassembly for a fuel cell stack, comprising:
a conductive fuel cell plate including a flow field disposed between a pair of headers, the headers including an aperture formed in the fuel cell plate for supplying a reactant to the flow field, and a datum hole formed in the fuel cell plate for alignment of the fuel cell plate during an assembly of the fuel cell stack;
a subgasket disposed adjacent to the fuel cell plate and having a hole aligned with the datum hole of the fuel cell plate; and
a non-conductive datum insert disposed within the datum hole of the fuel cell plate and configured to militate against a bending of the fuel cell plate around the datum hole during the assembly of the fuel cell stack,
wherein the datum insert includes an opening configured to receive a datum pin during the assembly of the fuel cell stack,
wherein the fuel cell plate includes a first unipolar plate bonded to a second unipolar plate, the datum insert disposed between the first and second unipolar plates at the datum hole, the datum hole defined by edges of the first unipolar plate and the second unipolar plate,
wherein the datum insert includes a stepped portion abutting at least one of the edges of one of the first unipolar plate and the second unipolar plate,
wherein the bonding of the first unipolar plate and the second unipolar plate includes at least one stitch weld disposed adjacent to the datum hole, and at least one retainer disposed through the fuel cell plate and the datum insert configured to secure the datum insert in place, wherein the retainer includes a stake, and
wherein a first portion of the datum insert is disposed between the first unipolar plate and the second unipolar plate at the datum hole, a second portion of the datum insert extends inwardly toward the datum hole and away from the edges of the first unipolar plate and the second unipolar plate, the second portion includes the stepped portion, and the opening is defined by at least one edge of the second portion of the datum insert that is spaced apart from the edges of the first unipolar plate and the second unipolar plate.

* * * * *